US008311662B2

(12) United States Patent
Davis et al.

(10) Patent No.: US 8,311,662 B2
(45) Date of Patent: Nov. 13, 2012

(54) DOCUMENT PROFILE DETECTION

(75) Inventors: Charles E. Davis, Mundelein, IL (US); Brian Bowers, Mundelein, IL (US); Jack E. Olson, Mundelein, IL (US)

(73) Assignee: Bell and Howell, LLC, Durham, NC (US)

( * ) Notice: Subject to any disclaimer, the term of this patent is extended or adjusted under 35 U.S.C. 154(b) by 488 days.

(21) Appl. No.: 12/640,445

(22) Filed: Dec. 17, 2009

(65) Prior Publication Data

US 2010/0161111 A1 Jun. 24, 2010

Related U.S. Application Data

(60) Provisional application No. 61/140,753, filed on Dec. 24, 2008.

(51) Int. Cl.
*G06F 7/00* (2006.01)

(52) U.S. Cl. ........ 700/215; 700/213; 700/219; 700/222; 700/223; 700/228

(58) Field of Classification Search ........................ None
See application file for complete search history.

(56) References Cited

U.S. PATENT DOCUMENTS

2007/0172109 A1 * 7/2007 Agrawal et al. ............... 382/139
2007/0172110 A1 * 7/2007 Adelberg et al. ............. 382/139

* cited by examiner

*Primary Examiner* — Gene Crawford
*Assistant Examiner* — Yolanda Jones
(74) *Attorney, Agent, or Firm* — McDermott Will & Emery LLP

(57) ABSTRACT

Systems and method of processing one or more documents are shown and described. The orientation of a magnetic character is sensed on the document. The orientation is processed and used to control a sort processing device.

22 Claims, 4 Drawing Sheets

| Condition 406 | Status 1 | Status 2 | Status 3 | Status 4 | Status 5 |
|---|---|---|---|---|---|
| MIPR 304 (is orientation correct?) | N | Y | Y | Y | Y |
| Thickness detector 306 (is thickness correct?) | N | N | Y | N | Y |
| Length/Width detector 308 (is L/H correct?) | N | N | N | Y | Y |
| **Determination (Profile) 408**<br><br>FIG 4 | Envelope contents are: misaligned, too thick & doesn't meet expected L/H threshold/criteria. **(Possibly not even a check)** | Envelope contents are: aligned, but too thick & doesn't meet expected L/H threshold/criteria. **(Possibly not even a check)** | Envelope contents are: aligned, thickness is as expected but exceeds expected L/H dimensions. **(Wrong contents in envelope, extra items attached to the check OR check larger than normal)** | Envelope contents aligned, L/H dimensions are as expected but thicker than expected. **(Check probably folded, but otherwise ok to process)** | Envelope contents are: aligned, thickness is as expected & meets expected L/H threshold/criteria. **(Perfect scenario for processing the check)** |
| **Action 410** | Deactivate downstream processing devices (e.g., letter opener); Divert to bin for manual processing | Deactivate downstream processing devices (e.g., letter opener); Divert to bin for manual processing | Deactivate downstream processing devices (e.g., letter opener); Divert to bin for manual processing --OR--<br>Perhaps check larger than normal; process as normal; update L/H threshold/criteria for this sender | Activate letter opener + unfold check + process payment | Activate letter opener + unfold check + process payment |

DOCUMENT PROFILE DETECTION

RELATED APPLICATIONS

This application claims the benefit of U.S. Provisional Application No. 61/140,753 filed Dec. 24, 2008, the disclosure of which is entirely incorporated herein by reference.

TECHNICAL FIELD

The subject matter presented relates to a method, apparatus and program product for adapting machine processing based on the inherent features and orientation of a document contained within an enclosure.

BACKGROUND

It is common practice for a vendor to request payment for services rendered to a customer in the form of credit, debit, direct wire transfer or other like means to expedite payment processing. In other instances, remuneration for services rendered is in the form of a check, in which case it is advantageous for the vendor to process the check as quickly as possible. Some large vendors (e.g., banks, brokerage firms, telecommunication companies) receive thousands of checks per day from customers respective to their accounts, all of which must be processed efficiently to ensure proper account maintenance and payment processing. Consequently, many of these vendors employ high speed sorters—transport devices designed to sort mail articles into various bins—that are further equipped with systems useful for processing checks. After all, it is the desire of the vendor to extract checks from incoming envelopes for immediate processing or at least segregate those envelopes having an enclosed check from those which do not. Devices employed in conjunction with an inbound sorter for performing such processing may include magnetic ink character recognition (MICR) devices for detecting the presence of and interpreting the meaning of magnetic ink deposits commonly imprinted on checks, precision envelope cutters, document removal means for extracting checks and imaging devices for capturing an image of and subsequently decoding the characters placed onto the check.

It is generally preferred in most check processing sort operations that the check is oriented upright, facing forward in the same manner as the envelope; so that envelopes containing these checks may be quickly detected, opened and the sorted to a sort bin for immediate processing. Variations of this preferred orientation, or similarly variation in thickness or skew of the check within the envelope hampers such sort processing. The extent to which the check is unfavorably oriented, folded, merged or otherwise placed in the envelope may necessitate it to be sorted to a separate sort bin for subsequent manual processing. Moreover, this may require that additional downstream processing devices be employed in conjunction with the sorter to unfold, unmerge and otherwise manipulate the check so that it may be processed accordingly. Consequently, a need exists for enabling effective processing of documents (e.g., checks) by a high-speed transport device (e.g., sorter) despite the inevitable variations in the orientation of said documents that may occur.

SUMMARY

The teachings herein alleviate one or more of the above noted problems with the known methods of providing navigational assistance. As shown an described below, the various systems and methods enable detection of the orientation of a document within, for example, an envelope. In response to the orientation, a portion of the document processing system is configured to processes the envelope. For example, an envelope opener can be enabled or disabled. As result, the speed and accuracy with which documents are processed is increased.

In one example, the disclosure is directed to a method of controlling a sort processing device of a sort processing system to process an envelope housing a document. The method includes sensing the orientation of a magnetic character on the document, during the transport of the envelope housing the document through the sorting system, processing the sensed orientation of the magnetic character; and controlling a sort processing device in response to the processing of the sensed orientation of the magnetic character to process the envelope. The orientation can be sensed using a magnetic ink pattern recognition detector. The processing of the sensed orientation can be performed by a sort control processing device.

In one instance, the method also includes detecting a relative thickness of the envelope housing the document during the transport of the envelope through the sorting system. A thickness detector can be used to detect the thickness. Also the processing includes processing the detected relative thickness of the envelope. The controlling also includes controlling a sort processing device in response to the processing of the sensed orientation of the magnetic character and the detected relative thickness of the envelope.

In another instance, the method includes detecting dimensional criteria of the envelope housing the document, using a dimensional detector, during the transport of the envelope through the sorting system. The processing also includes processing the detected dimensional criteria of the envelope. The controlling can also include controlling the sort processing device in response to the processing of the sensed orientation of the magnetic character and the detected dimensional criteria of the envelope.

In other instances, the method includes using a magnetic pattern analyzer to process the sensed orientation of the magnetic character on the document. Also, controlling a sort processing device can include activating a letter opening device and opening the envelope to process the envelope. The controlling can also include deactivating the letter opener. Controlling, in some examples, also includes activating a diverter to divert the envelope to a specified processing bin. In addition, the method can include as part of the processing determining a profile of the document housed within the envelop. The profile can indicate indicates whether the document is folded, properly aligned, or within expected dimensional criteria.

In another example, the disclosure is directed to a method of controlling a sort processing device of a sort processing system to process an envelope housing a document. The method includes detecting a relative thickness of the envelope housing the document during the transport of the envelope through the sorting system and detecting dimensional criteria of the envelope housing the document during the transport of the envelope through the sorting system. A thickness detector can be used to detect the relative thickness. A dimensional detector can detect the dimensional criteria.

The method also includes processing, by a sort control processing device, the sensed orientation of the magnetic character, the detected relative thickness of the envelope, and the detected dimensional criteria of the envelope. In addition, the method includes controlling a sort processing device in response to the processing of the sensed orientation of the magnetic character, the detected relative thickness of the envelope, and the detected dimensional criteria of the envelope to process the envelope.

In another example, various aspects of a document processing system are described. The system includes a magnetic ink pattern recognition detector, a sort control processing device, and a sort processing device. The magnetic ink pattern recognition detector that senses the orientation of a magnetic character on a document housed in an envelope during the transport of the envelope through a sorting system of the document processing system. The sort control processing device is in communication with the magnetic ink pattern recognition detector. The sort control processing device receives the sensed orientation of the magnetic character and creates a profile of the document based at least in part thereon. The sort processing device is in communication with the sort control processing device and is configured responsive to the profile of the document.

In one instance, the system includes a thickness detector that detects the relative thickness of the envelope housing the document envelope during the transport of the envelope through the sorting system. The sort control processing device is in communication with the thickness detector and receives the detected relative thickness of the envelope and creates the profile of the document based at least in part thereon.

In another example, the system includes a dimensional detector that detecting dimensional criteria of the envelope housing the document during the transport of the envelope through the sorting system. The sort control processing device is in communication with the dimensional detector and receives the detected dimensional criteria of the envelope and creates the profile of the document based at least in part thereon.

The sort processing device can include a letter opener that is activated when the profile indicates to open the envelope housing the document. Also, the sort processing device can include a diverter that is activated to divert the envelope when the profile indicated that the envelope should not be opened using another sort processing device.

Also, the system can include a pattern analyzer in communication with the magnetic ink pattern recognition detector. The pattern analyzer is configured to compare the sensed orientation of the magnetic character on a document to a known standard orientation.

The profile can indicate that the document is folded. The dimensional criteria can include length and/or width. The document can be a check.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4 presents an exemplary matrix illustrating different responses the system of FIG. 3 may exercise in response to detected variations in orientation of a document, such as a check.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
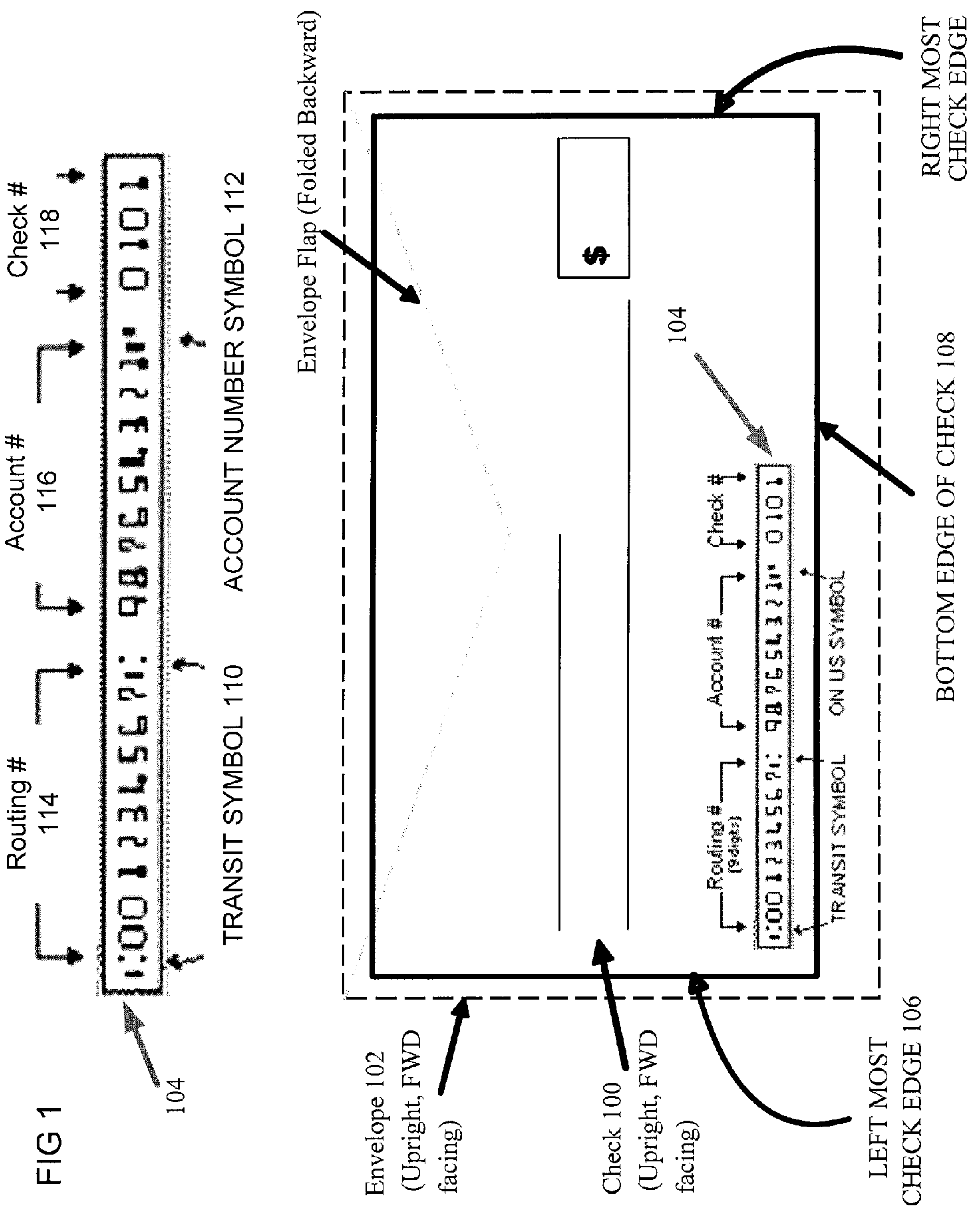
FIG. 1 depicts an exemplary pattern of characters that may be placed onto a document, such as a check, as placed within an envelope for transactional processing.

FIG. 1 depicts an exemplary pattern of characters 104 that may be placed onto a document, such as a check 100 contained within an envelope 102 for transactional processing. In this case, the check 100 assumes a preferred profile within envelope 102—i.e., facing forward relative to the face of the envelope 102, oriented upright, with magnetic characters forming a composite pattern 104 printed near the check's leftmost 106 bottom edge 108 readable from left to right. As will be recognized by those skilled in the art, the magnetic pattern is representative of the following data types: a routing number 114, account number 116 and check number 118 as printed on a typical check (may vary in accord with differing banking jurisdictions). Each of these data types are generally prefixed, separated or delimited by various symbols, namely a transit symbol 110 (Unicode value U+2446) and/or an account number symbol 112 (Unicode value U+2338). Such a pattern 104 is printed onto the check with ink containing magnetic properties, enabling the pattern 104 and/or individual characters 110 or 112 comprising the pattern 104 to be detected by a magnetic ink detection device. In effect, standard use of symbols 110/112 or pattern 104 serves as a point of reference for discerning differing document types.

With respect to the present teachings, a high speed transport and document processing device such as a sorter may base its sort processing decisions on factors including, but not limited to: the presence, location and orientation of the magnetic pattern 104 upon a document. In conjunction with these factors may be other physical indicators such as the document's thickness, height and length. These factors, when considered singularly or in combination, may reveal the profile of a document—i.e., the placement, position or orientation of a document. Information representative of a sort item's profile may serve as input data for a sort scheme or as data for affecting a downstream processing device's behavior with respect to that particular sort item.

Figure 2A:
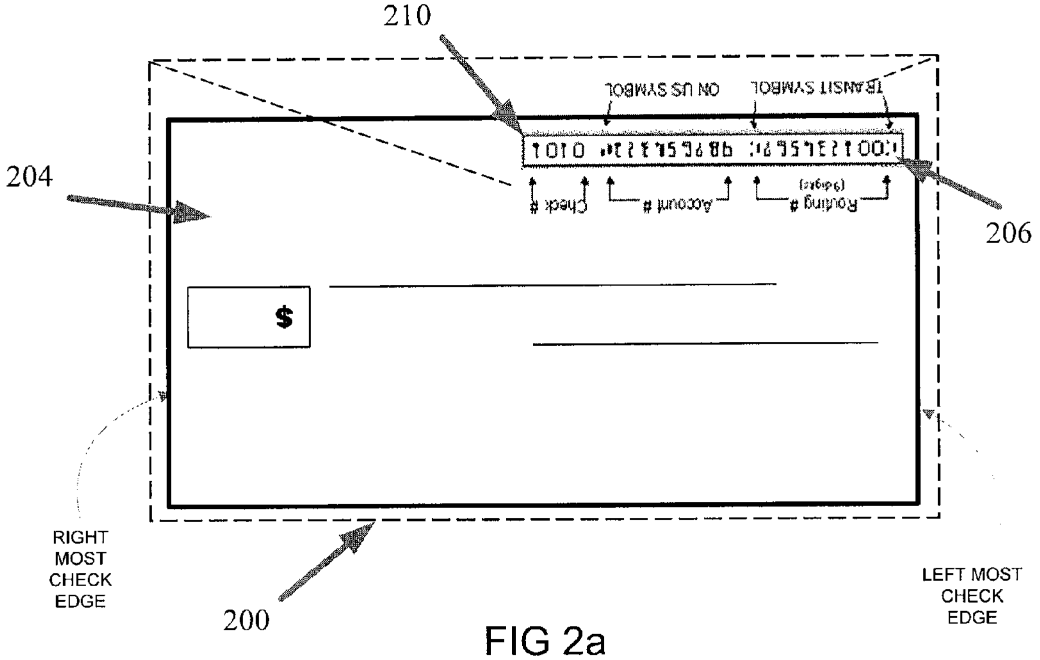
FIGS. 2*a-b* depicts different exemplary orientations of a document, such as a check, as placed within an envelope for transactional processing.
Figure 2B:
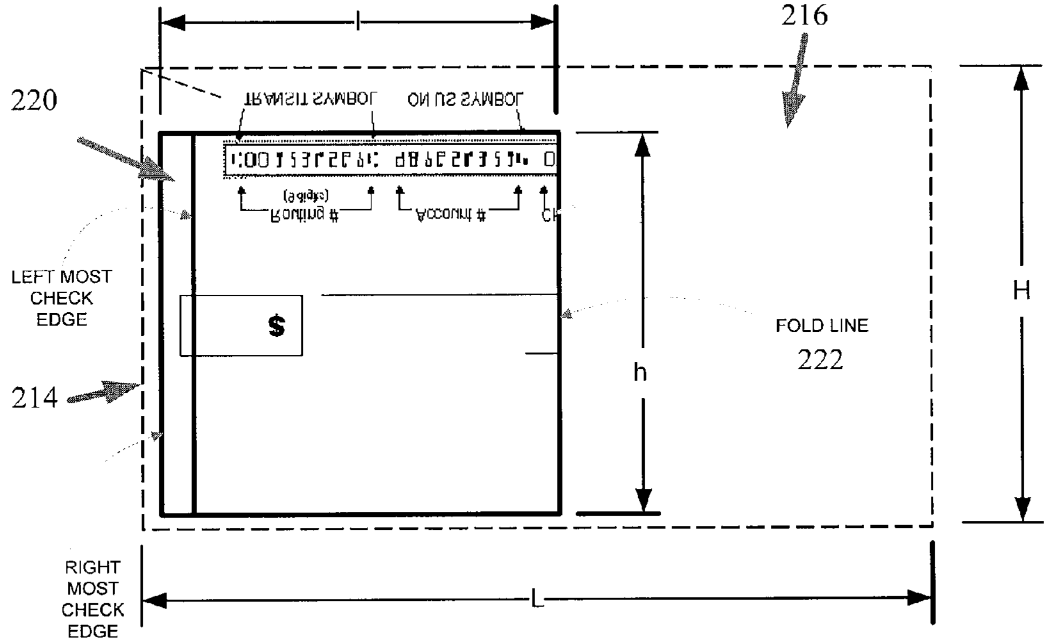

Consider for example FIG. 2*a*, which depicts an exemplary upright/forward facing envelope 200 containing a check 202 whose profile is oriented upside down/forward facing—an obvious departure from the standard or preferred profile of the check 100 of FIG. 1. As a result of this profile, the magnetic pattern 210 printed on the check 200 (e.g., beginning with the transit symbol 206) is positioned toward the upper right hand region of the envelope as opposed to the lower left hand region. In FIG. 2*b*, the check 220 profile is even further altered from that of FIG. 1, this time being oriented upside down/forward facing as in FIG. 2*a*, but folded along fold line 222.

Because it is folded, the magnetic pattern 224 is not readily physically visible, and in fact results in some of the characters comprising the pattern 224 to overlap each other. In both examples, the resultant change in presence, location and orientation of an expected pattern or symbol respective to the document—transit symbol 110, account number symbol 112—acts as a means of detecting a change in document profile.

As yet another example, consider an order form (not shown) having various pre-designated regions for placement of a stamp containing a magnetic pattern of characters to be affixed to enable placement of an order. Obviously, the presence and orientation of the magnetic characters of the stamp will affect the order instructions to be carried out; affecting how such documents are to be sorted—i.e., sorted to a bind designated for one order fulfillment department versus another. Processing decisions within the sorter—i.e., which downstream processing devices to employ or which bins to sort an envelope to—may be adapted to the extent the presence, location and/or orientation of individual magnetic characters or patterns varies from what is expected.

Figure 3:
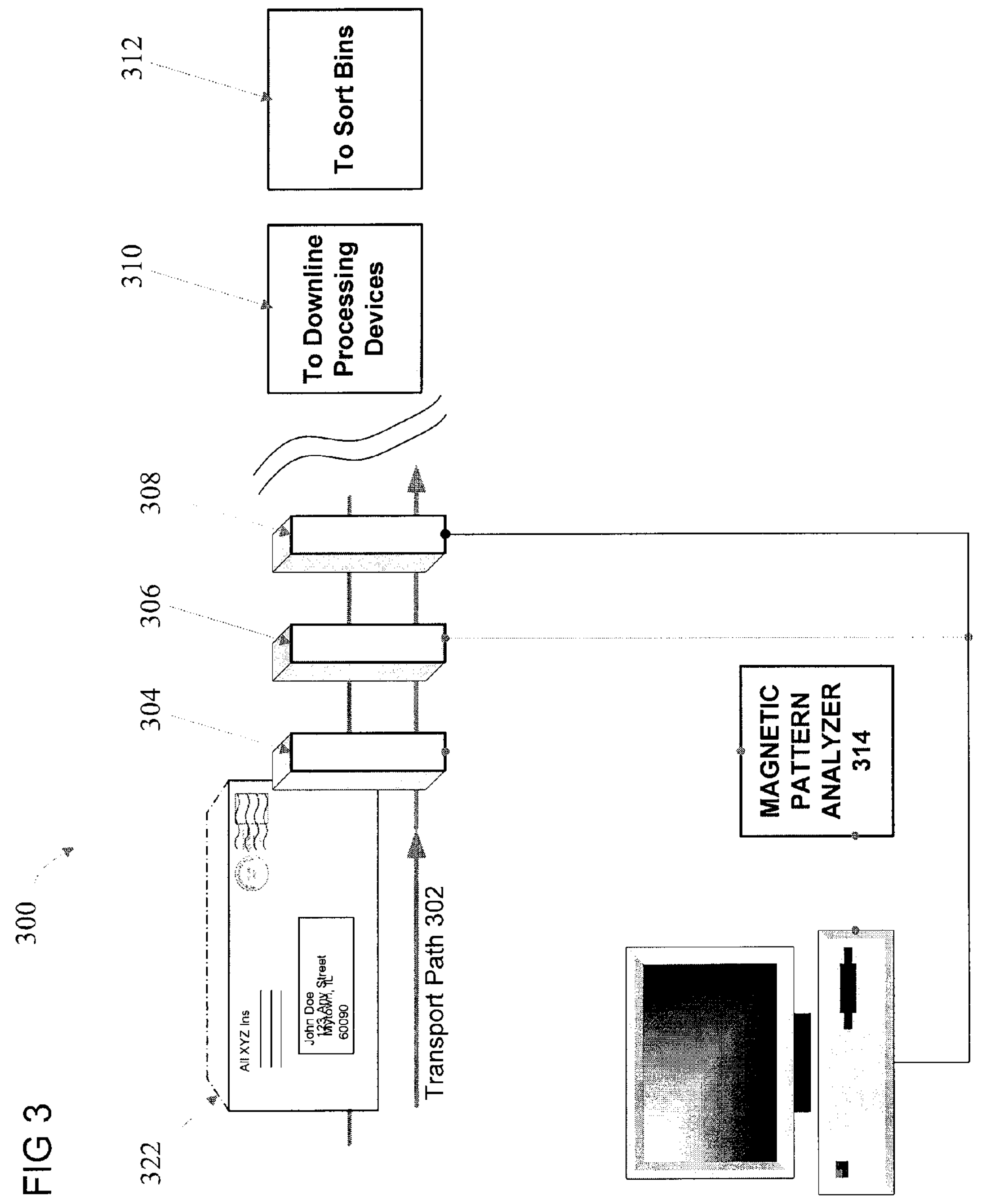
FIG. 3 depicts an exemplary system for performing transactional processing of documents as illustrated in FIGS. 2*a-b*.

To enable processing of documents such as the checks shown in FIGS. 1, 2*a* and 2*b* through a sorter system 300 on the basis of a determined profile, varying types of inline detection and sensing devices are employed during item transport along a transport path 302. With reference to FIG. 3, the devices employed in connection with an exemplary sorter system 300 may include, but is not limited to: a Magnetic Ink Pattern Recognition (MIPR) detector 304 for sensing and recognizing the pattern and orientation of the magnetic characters resident upon a document, a thickness detector 306 for detecting relative changes in thickness of an envelope under inspection during transport and a length and height detector 308 for detecting relevant changes in dimensions of objects during transport. Additional processing devices that may also operate upon the document down-line during transport 302 may include, but is not limited to a printer, cutter, unfolder, labeler, etc. These down-line processing devices are represented in the figure by box 310. Finally, the documents are sorted into one of a collection of sort bins 312 in accord with a specific sort scheme.

The MIPR 304 enables the detection of and decoding of the magnetically printed ink patterns as printed onto a document under transport, in this case an envelope 322 containing a check, and may even perform such detection through the envelope 322. Rather than read and interpret the magnetic characters themselves, the MIPR 304 employs a pattern analyzer 314 that compares a detected magnetic characters orientation versus a standard orientation. Hence, in the case of the check in FIG. 2*a*, the pattern analyzer 314 may note the discrepancy in orientation of the transit symbol 206 from an expected orientation of a transit symbol 110 as shown in FIG. 1. The pattern analyzer 314 may interface with or operate upon a control processing device 316 associated with the sorter system 300. Generally, the MIPR is mounted along and in proximity to the transport path 302 provided by the sorter system 300. It may be implemented as a module comprising an array of inductive sensor elements, wound or coupled for sensing localized magnetic fields, along with various circuitry or components (e.g., signal tuning elements, output buffer stages, power supply components).

Operating in connection with the MIPR detector 304 is a thickness detector 306 for detecting and quantifying variations in thickness of a document under inspection. For example, in FIG. 2*b* the folding of the check 220 results in significant variation in the detected thickness of the document as it is scanned along the entirety of its length L and height H. In particular, the determined thickness will be greatest to the left of the fold line 222 where the thickness is characterized by that of the folded check 220, respective front and back faces of the envelope 214 and flap 216. This is in contrast to the determined thickness of the document as perceived to the right of the fold line 222 where the thickness is characterized by that of the envelope 214 and flap 216. This data as collected by the thickness detector 306 may be used in conjunction with the pattern data ascertained by the MIPR 304 (with pattern analyzer 314) to further detect the profile of the contents of the document 214. Generally, the thickness detector 306 is mounted along and in proximity to the transport path 302 provided by the sorter system 300 for inspecting the contents of any document during transport.

The length and height detector 308 may also collect length and height data pertaining to the document under inspection or its contents. For example, assume that the check 220 contained within envelope 214 is expected to be of a length l' and height h' (note: these dimensions may differ from the length L and height H of the envelope 214). In examining the contents of the envelope 214 of FIG. 2*b* the length and height detector 308 may indeed identify the check as corresponding to a height h', but a length l. Hence, the expected length l' will differ from the determined length l. Again, such data as collected by the length and height detector 308 may be used in conjunction with the pattern data ascertained by the MIPR 304 (with pattern analyzer 314) and the thickness detector 306 to further detect the profile of the contents of the document 214. Generally, the length and height detector 308 is mounted along and in proximity to the transport path 302 provided by the sorter system 300 for inspecting the contents of any document during transport.

With the above described considerations in mind, it is apparent to those skilled in the art that variations in the detected characteristics of the document under inspection may warrant differing responses to how the document is handled by the sorter system 300. FIG. 4 presents an exemplary matrix illustrating some of the differing responses that the sorter system 300 may exercise in response to detected variations in the magnetic pattern data, document thickness or length/height data. The extent of variation from expectation is reflected in the chart by statuses 1-5. Of course, skilled practitioners will recognize that the action scenarios 410 presented in the figure are exemplary in nature only, and do not limit the scope of the teachings. For example, while the matrix suggests the diversion of an item under inspection when it does not meet magnetic pattern, document thickness or length/height expectations, alternative approaches such as marking the envelope could be performed. The teachings are not limited to only those scenarios presented herein, and may be adapted to the extent and capability of the sorter device performing the processing.

Those skilled in the art will recognize that the teachings herein leverage information pertaining to the presence, location or orientation of the magnetic characters as a means of informing sorter processing decisions. This is a departure from prior art approaches to sort processing that rely upon reading or interpreting of the actual characters as imprinted upon the document, whether magnetic ink or not, such as via the use of a magnetic ink character reader (MICR) or object character reader (OCR) utility. Indeed, it will be appreciated by skilled practitioners that decoding of the actual characters for interpreting their meaning or for enabling input to a sort scheme to affect sort decisions is not a facet of the teachings. Also, while the description presented herein refers generally to the profiling of checks, it will be recognized by skilled artisans that the exemplary techniques herein pertain to any documents having magnetic characters printed thereon.

As shown by the above discussion, functions relating to the document profile detection and/or associated sorter system control may be implemented on computers, operating as the pattern analyzer 314 and/or the sorter control processing device 316 as shown in FIG. 3. Although special purpose devices may be used, such devices also may be implemented using one or more hardware platforms intended to represent a general class of data processing device commonly used to run "personal computer" or "server" programming so as to implement the functions discussed above, albeit with an appropriate network connection for data communication with the other system elements.

As known in the data processing and communications arts, a general-purpose computer typically comprises a central processor or other processing device, an internal communication bus, various types of memory or storage media for code and data storage, and one or more network interface cards or ports for communication purposes. The software functionalities involve programming, including executable code as well as associated stored data, e.g. files used for the document profile detection and associated sorter system control. The software code is executable by the general-purpose computer that functions as the analyzer 314 and/or that functions as the sorter control processing device 316. In operation, the code is stored within the general-purpose computer platform. At other times, however, the software may be stored at other locations and/or transported for loading into the appropriate general-purpose computer system. Execution of such code by a processor of the computer platform enables the platform to implement the document profile detection and sorter system control functions discussed and illustrated herein.

Hence, aspects of the methods of document profile detection outlined above may be embodied in programming. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a host computer into the computer platform of the analyzer or the sorter system control processing device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of controlling a sort processing device of a sort processing system to process an envelope housing a document, the method comprising steps of:

sensing the orientation of a magnetic character on the document, using a magnetic ink pattern recognition detector, during the transport of the envelope housing the document through the sorting system;

processing, by a sort control processing device, the sensed orientation of the magnetic character; and controlling a sort processing device in response to the processing of the sensed orientation of the magnetic character to process the envelope.

2. The method of claim 1, further comprising detecting a relative thickness of the envelope housing the document, using a thickness detector, during the transport of the envelope through the sorting system and wherein:

the processing further comprises processing the sensed orientation of the magnetic character and the detected relative thickness of the envelope; and the controlling the sort processing device in response to the processing of the sensed orientation of the magnetic character and the detected relative thickness of the envelope.

3. The method of claim 1, further comprising detecting dimensional criteria of the envelope housing the document, using a dimensional detector, during the transport of the envelope through the sorting system and wherein:

the processing further comprises processing the sensed orientation of the magnetic character and the detected dimensional criteria of the envelope; and the controlling the sort processing device in response to the processing of the sensed orientation of the magnetic character and the detected dimensional criteria of the envelope.

4. The method of claim 1, further comprising processing, using a magnetic pattern analyzer, the sensed orientation of the magnetic character on the document.

5. The method of claim 1, wherein controlling a sort processing device includes activating a letter opening device and opening the envelope to process the envelope.

6. The method of claim 1, wherein controlling a sort processing device includes deactivating a letter opener.

7. The method of claim 1, wherein controlling a sort processing device includes activating a diverter to divert the envelope to a specified processing bin.

8. The method of claim 1, wherein processing includes determining a profile of the document housed within the envelop.

9. The method of claim 8, wherein the profile indicates whether the document is folded, properly aligned, or within expected dimensional criteria.

10. A document processing system comprising:

a magnetic ink pattern recognition detector that senses the orientation of a magnetic character on a document housed in an envelope during the transport of the envelope through a sorting system of the document processing system;

a sort control processing device in communication with the magnetic ink pattern recognition detector, the sort control processing device receiving the sensed orientation of the magnetic character and creating a profile of the document based at least in part thereon; and a sort processing device in communication with the sort control processing device, the sort processing device being configured responsive to the profile of the document.

11. The system of claim 10 further comprising a thickness detector that detects the relative thickness of the envelope housing the document envelope during the transport of the envelope through the sorting system and wherein the sort control processing device is in communication with the thickness detector and receives the detected relative thickness of the envelope and creates the profile of the document based at least in part thereon.

12. The system of claim 10 further comprising a dimensional detector that detecting dimensional criteria of the envelope housing the document during the transport of the envelope through the sorting system and wherein the sort control processing device is in communication with the dimensional detector and receives the detected dimensional criteria of the envelope and creates the profile of the document based at least in part thereon.

13. The system of claim 10, wherein the sort processing device comprises a letter opener and the letter open is activated when the profile indicates to open the envelope housing the document.

14. The system of claim 10, wherein the sort processing device comprises a diverter and the diverter is activated to divert the envelope when the profile indicated that the envelope should not be opened using another sort processing device.

15. The system of claim 13, wherein the profile indicates that the document is folded.

16. The system of claim 14, wherein the profile indicates that the document is folded.

17. The system of claim 10, wherein the dimensional criteria comprise length or width.

18. The system of claim 10, wherein the document comprises a check.

19. The system of claim 10, further comprising a pattern analyzer in communication with the magnetic ink pattern recognition detector configured to compare the sensed orientation of the magnetic character on a document to a known standard orientation.

20. A method of controlling a sort processing device of a sort processing system to process an envelope housing a document, the method comprising steps of:

sensing the orientation of a magnetic character on the document, using a magnetic ink pattern recognition detector, during the transport of the envelope housing the document through the sorting system;

detecting a relative thickness of the envelope housing the document, using a thickness detector, during the transport of the envelope through the sorting system;

detecting dimensional criteria of the envelope housing the document, using a dimensional detector, during the transport of the envelope through the sorting system;

processing, by a sort control processing device, the sensed orientation of the magnetic character, the detected relative thickness of the envelope, and the detected dimensional criteria of the envelope; and controlling a sort processing device in response to the processing of the sensed orientation of the magnetic character, the detected relative thickness of the envelope, and the detected dimensional criteria of the envelope to process the envelope.

21. The method of claim 20, wherein processing includes determining a profile of the document housed within the envelop.

22. The method of claim 21, wherein the profile indicates whether the document is folded, properly aligned, or within expected dimensional criteria.

* * * * *